(12) United States Patent
Kattainen et al.

(10) Patent No.: US 12,415,705 B2
(45) Date of Patent: Sep. 16, 2025

(54) ELEVATOR COMMUNICATION SYSTEM

(71) Applicant: KONE Corporation, Helsinki (FI)

(72) Inventors: Ari Kattainen, Helsinki (FI); Ferenc Staengler, Helsinki (FI); Juha-Matti Aitamurto, Helsinki (FI); Gergely Huszak, Helsinki (FI)

(73) Assignee: KONE CORPORATION, Helsinki (FI)

( * ) Notice: Subject to any disclaimer, the term of this patent is extended or adjusted under 35 U.S.C. 154(b) by 445 days.

(21) Appl. No.: 17/958,527

(22) Filed: Oct. 3, 2022

(65) Prior Publication Data

US 2023/0026908 A1 Jan. 26, 2023

Related U.S. Application Data

(63) Continuation of application No. PCT/FI2021/050003, filed on Jan. 4, 2021.

(30) Foreign Application Priority Data

Apr. 30, 2020 (EP) .................................... 20172438
Oct. 21, 2020 (EP) .................................... 20203069

(51) Int. Cl.
*B66B 1/34* (2006.01)
*B66B 1/24* (2006.01)
*B66B 5/00* (2006.01)
*B66B 13/22* (2006.01)
*H04L 12/40* (2006.01)

(52) U.S. Cl.
CPC ............ *B66B 1/343* (2013.01); *B66B 1/2466* (2013.01); *B66B 1/3453* (2013.01); *B66B 1/3461* (2013.01); *B66B 5/0031* (2013.01); *B66B 13/22* (2013.01); *H04L 12/40182* (2013.01); *H04L 12/40195* (2013.01); *B66B 2201/30* (2013.01)

(58) Field of Classification Search
CPC ..... B66B 1/343; B66B 1/2466; B66B 1/3453; B66B 1/3461; B66B 5/0031; B66B 13/22; B66B 2210/30; H04L 12/40182; H04L 12/40195
See application file for complete search history.

(56) References Cited

U.S. PATENT DOCUMENTS 6,973,029 B1  12/2005  Jantzen
2011/0162913 A1  7/2011  Kattainen et al.
(Continued)

OTHER PUBLICATIONS

International Search Report, issued in PCT/FI2021/050003, dated Mar. 29, 2021.
(Continued)

*Primary Examiner* — Duc C Ho
(74) *Attorney, Agent, or Firm* — Birch, Stewart, Kolasch & Birch, LLP

(57) ABSTRACT

An elevator communication system includes a first elevator controller, a second elevator controller communicatively connected to the first elevator controller, a first ethernet bus portion connected to the first elevator controller, a second ethernet bus portion connected to the second elevator controller, and at least one elevator system node communicatively connected to the first elevator controller via the first ethernet bus portion and to the second elevator controller via the second ethernet bus portion.

20 Claims, 5 Drawing Sheets

(56) References Cited

U.S. PATENT DOCUMENTS

2012/0152661 A1\* 6/2012 Suzuki ................. B66B 1/2458
　　　　　　　　　　　　　　　　　　　187/382
2015/0090534 A1　4/2015 Finschi
2020/0079619 A1　3/2020 Thum et al.
2023/0027318 A1\* 1/2023 Kattainen ............. B66B 1/3453

OTHER PUBLICATIONS

Written Opinion of the International Searching Authority, issued in PCT/FI2021/050003, dated Mar. 29, 2021.

\* cited by examiner

ELEVATOR COMMUNICATION SYSTEM

CROSS REFERENCE TO RELATED APPLICATIONS

This application is a Continuation of PCT International Application No. PCT/FI2021/050003, filed on Jan. 4, 2021, which claims priority under 35 U.S.C. 119(a) to Patent Application Nos. 20172438.2, filed in Europe on Apr. 30, 2020 and 20203069.8, filed in Europe on Oct. 21, 2020, all of which are hereby expressly incorporated by reference into the present application.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different protocol stacks and multiple different physical layers may be used simultaneously. The use of multiple different internal data transmission solutions may result in a complicated and inefficient solution.

Further, a redundant safety bus system may be implemented using, for example, a CAN protocol or with RS485 time triggered protocol (TTS). It has duplicated communication channels, both with the same structure and same data communicated. In this solution two parallel communication channels are needed for safety reasons. These techniques, however, cannot be used when an elevator communication system uses, for example, an ethernet bus based communication.

Thus, it would be beneficial to have a solution that would alleviate at least one of these drawbacks.

SUMMARY

According to a first aspect, there is provided an elevator communication system comprising a first elevator controller, a second elevator controller communicatively connected to the first elevator controller, a first ethernet bus portion connected to the first elevator controller, a second ethernet bus portion connected to the second elevator controller, and at least one elevator system node communicatively connected to the first elevator controller via the first ethernet bus portion and to the second elevator controller via the second ethernet bus portion. This enables a solution in which communication capability between elements in the elevator communication system is maintained even if one of the first or second ethernet bus portions is faulty.

In an implementation form of the first aspect, the first ethernet bus portion comprises sequential bus segments interconnected by at least one switch, the first ethernet bus portion extending in a first elevator shaft, and the second ethernet bus portion comprises sequential bus segments interconnected by at least one switch, the second ethernet bus portion extending in a second elevator shaft.

In an implementation form of the first aspect, the at least one elevator system node comprises a first pit inspection station associated with the first ethernet bus portion and a second pit inspection station associated with the second ethernet bus portion, and the first pit inspection station associated with the first ethernet bus portion is communicatively connected to the second pit inspection station associated with the second ethernet bus portion with a multi-drop ethernet bus segment.

In an implementation form of the first aspect, the communication system comprises a shared ethernet bus segment communicatively connected to the first ethernet bus portion and to the second ethernet bus portion, and wherein the at least one elevator system node is connected to the shared ethernet bus segment.

In an implementation form of the first aspect, the shared ethernet bus segment is connected to a switch of the first ethernet bus portion and to a switch of the second ethernet bus portion.

In an implementation form of the first aspect, the sequential bus segments of the first ethernet bus section comprise a point-to-point ethernet bus segment between a first switch and a second switch and a first multi-drop ethernet bus segment between the first switch and the second switch, and wherein the sequential bus segments of the second ethernet bus section comprise a point-to-point ethernet bus segment between a third switch and a fourth switch and a second multi-drop ethernet bus segment between the third switch and the fourth switch. The at least one elevator system node comprises a first node arranged in the first multi-drop ethernet bus segment and a second node arranged in the second multi-drop ethernet bus segment, and the elevator communication system further comprises a shared ethernet bus segment configured between the first node and the second node.

In an implementation form of the first aspect, the elevator communication system further comprises a first multi-drop segment connected to a switch of the first ethernet bus portion, the first multi-drop segment comprising a first node, and a second multi-drop segment connected to a switch of the second ethernet bus portion, the second multi-drop segment comprising a second node, and a shared ethernet bus segment configured between the first node and to the second node.

In an implementation form of the first aspect, the first node is configured to act as a coordinator and the second node is configured to act as a back-up coordinator. The first node is configured to periodically supervise the second node, to detect loosing of a supervision contact to the second node, and to instruct the most distant visible node in the shared ethernet bus segment to terminate the shared ethernet bus segment. The second node is configured to detect loosing of the supervision contact to the first node, to set itself as a coordinator, to instruct the most distant visible node in the shared ethernet bus segment to terminate the shared ethernet bus segment, and to start switching traffic.

In an implementation form of the first aspect, the first node is configured to regain supervision contact to the second node, to instruct the most distant visible node in the shared ethernet bus segment to remove the termination, and the second node is configured to regain the supervision contact to the first node, to instruct the most distant visible node in the shared ethernet bus segment to remove the termination, and to stop switching traffic.

In an implementation form of the first aspect, the shared ethernet bus segment comprises a shared multi-drop ethernet bus segment.

According to a second aspect, there is provided an elevator system comprising the elevator communication system of the first aspect.

In an implementation form of the second aspect, the elevator system comprises a plurality of elevator cars configured to move independently in a same elevator shaft.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises a first elevator controller, a second elevator controller communicatively connected to the first elevator controller, a first ethernet bus portion connected to the first elevator controller, a second ethernet bus portion connected to the second elevator controller and at least one elevator system node communicatively connected to the first elevator controller via the first ethernet bus portion and to the second elevator controller via the second ethernet bus portion. The illustrated solution may enable, for example, a solution with an improved reliability and availability of an all-ethernet elevator communication system. Further, elevator service and data communication in the elevator communication system does not have to be interrupted in case of a single failure in the elevator communication system.

Further, the term "communicatively connected" used herein may mean that an element may be directly connected to another element, node or bus or that it may be indirectly connected to the another element, node or bus via a connecting element, node or bus.

In an example embodiment, the various embodiments discussed below may be used in an elevator system comprising at least one elevator that is suitable and may be used for transferring passengers between landing floors of a building in response to service requests. In another example embodiment, the various embodiments discussed below may be used in an elevator system comprising at least one elevator that is suitable and may be used for automated transferring of passengers between landings in response to service requests.

Figure 1A:
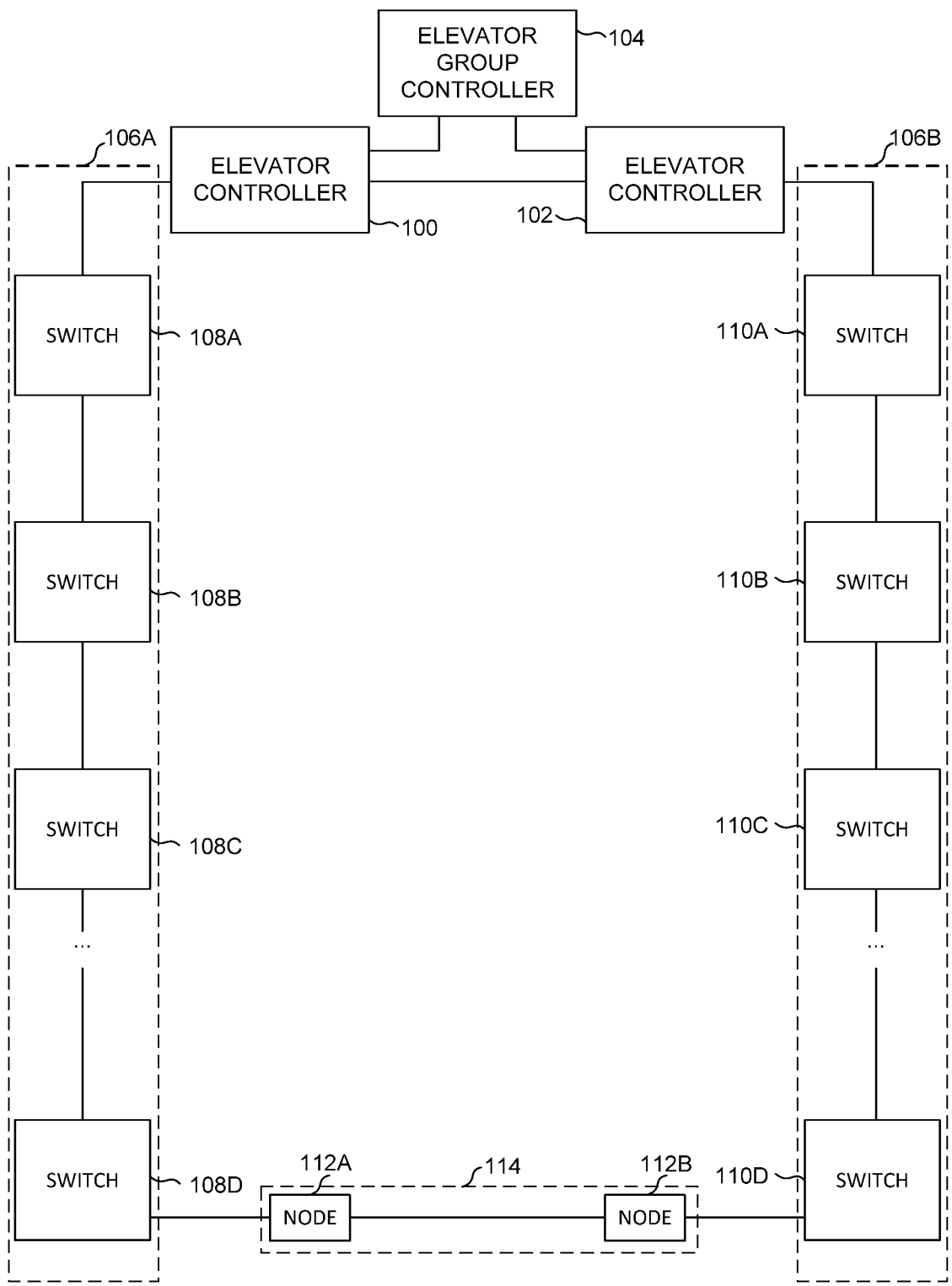
FIG. 1A illustrates an elevator communication system according to an example embodiment.

FIG. 1A illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In some embodiments, the elevator group controller 104 may be integrated into one of the elevator controllers 100, 102 such that the elevator controller runs group controller software to implement also group controller functions.

The elevator communication system may comprise a first ethernet bus portion 106A connected to the first elevator controller 100 and a second ethernet bus portion 106B connected to the second elevator controller 102. The first ethernet bus portion 106A may comprise sequential bus segments interconnected by at least one switch 108A-108C or other interconnecting unit. The first ethernet bus portion 106A may extend in a first elevator shaft. Similarly, the second ethernet bus portion 106B may comprise sequential bus segments interconnected by at least one switch 110A-110C or other interconnecting unit. The second ethernet bus portion 106B may extend in a second elevator shaft.

The first ethernet bus portion 106A may comprise a point-to-point ethernet bus and at least one connecting unit 108A, 108B, 108C interlinked to each other. The second ethernet bus portion 106B may comprise a point-to-point ethernet bus and at least one connecting unit 110A, 110B, 110C interlinked to each other. The connecting units 108A-108C and 110A-110C may refer, for example, to a switch. Further, the point-to-point ethernet bus may be, for example, a 100BASE-TX or 10BASET1L point-to-point ethernet bus.

The elevator communication system may comprise at least one elevator system node 112A, 112B communicatively connected to the first elevator controller 100 via the first ethernet bus portion 106A and to the second elevator controller 102 via the second ethernet bus portion 106B. In an example embodiment, the elevator system nodes 112A, 112B may refer to pit inspection nodes.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1B:
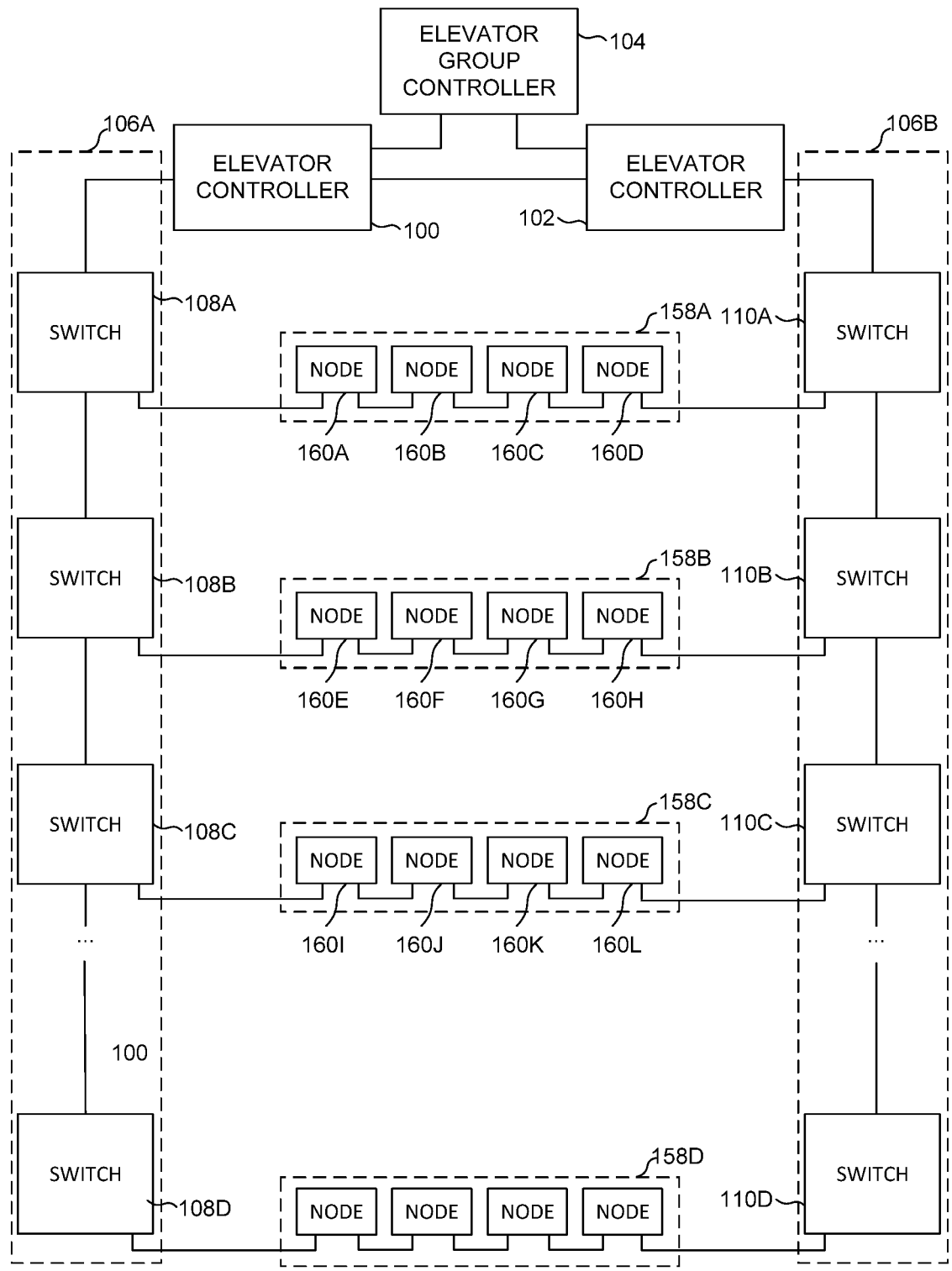
FIG. 1B illustrates an elevator communication system according to another example embodiment.

FIG. 1B illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In some embodiments, the elevator group controller 104 may be integrated into one of the elevators controller 100, 102 such that the elevator controller runs also group controller software to implement group controller functions.

The elevator communication system may comprise a first ethernet bus portion 106A connected to the first elevator controller 100 and a second ethernet bus portion 106B connected to the second elevator controller 102. The first ethernet bus portion 106A may comprise sequential bus segments interconnected by at least one switch 108A-108C or other interconnecting unit. The first ethernet bus portion 106A may extend in a first elevator shaft. Similarly, the second ethernet bus portion 106B may comprise sequential bus segments interconnected by at least one switch 110A-110C or other interconnecting unit. The second ethernet bus portion 106B may extend in a second elevator shaft.

The first ethernet bus portion 106A may comprise a point-to-point ethernet bus and at least one connecting unit 108A, 108B, 108C interlinked to each other. The second ethernet bus portion 106B may comprise a point-to-point ethernet bus and at least one connecting unit 110A, 110B, 110C interlinked to each other. The connecting units 108A-108C and 110A-110C may refer, for example, to a switch. Further, the point-to-point ethernet bus may be, for example, a 100BASE-TX or 10BASET1L point-to-point ethernet bus.

The elevator communication system further comprises a shared ethernet bus segment 158A-158D communicatively connected to the first ethernet bus portion 106A and to the second ethernet bus portion 106B. One or more elevator system nodes 160A-160L may be connected to the shared ethernet bus segment 158A-158D. The shared ethernet bus segment 158A-158D may be connected to a switch 108A-108C of the first ethernet bus portion 106A and to a switch 110A-110C of the second ethernet bus portion 106B.

As can be seen from FIG. 1B, each node in the elevator communication system is reachable via at least two different routes. For example, if the shared ethernet bus segment 158A becomes faulty between the node 160D and the switch 110A of the second ethernet bus portion 106B, communication is still enabled for the node 160D via the switch 108A of the first ethernet bus portion 106A.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1C:
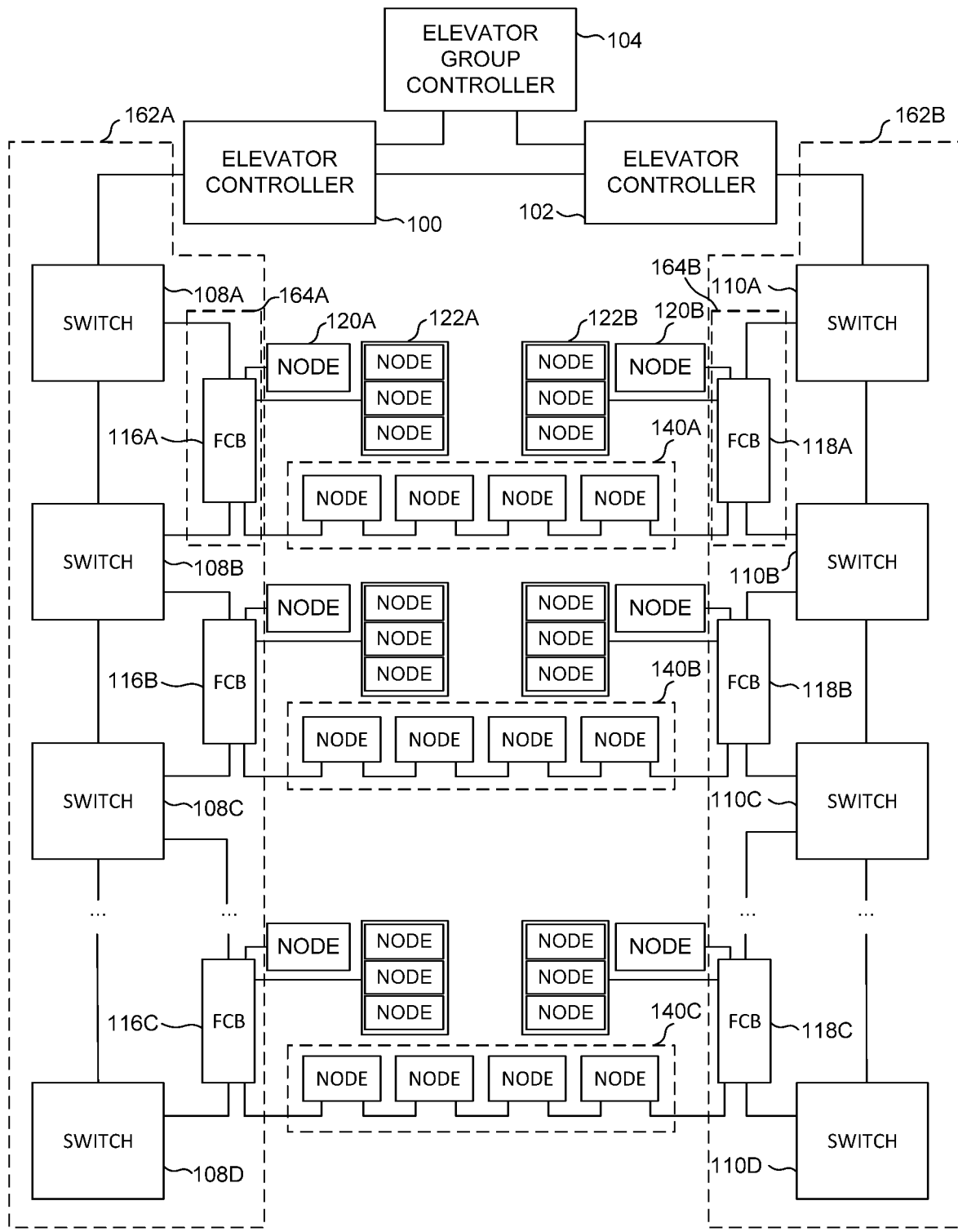
FIG. 1C illustrates an elevator communication system according to another example embodiment.

FIG. 1C illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In some embodiments, the elevator group controller 104 may be integrated into one of the elevator controllers 100, 102 such that the elevator controller runs also group controller software to implement group controller functions.

The elevator communication system may comprise a first ethernet bus portion 162A connected to the first elevator controller 100 and a second ethernet bus portion 162B connected to the second elevator controller 102. The first ethernet bus portion 162A may comprise sequential bus segments interconnected by at least one switch 108A-108C or other interconnecting unit. The first ethernet bus portion 162A may extend in a first elevator shaft. Similarly, the second ethernet bus portion 162B may comprise sequential bus segments interconnected by at least one switch 110A-110C or other interconnecting unit. The second ethernet bus portion 162B may extend in a second elevator shaft.

The first ethernet bus portion 106A may comprise a point-to-point ethernet bus and at least one connecting unit 108A, 108B, 108C interlinked to each other. The second ethernet bus portion 106B may comprise a point-to-point ethernet bus and at least one connecting unit 110A, 110B, 110C interlinked to each other. The connecting units 108A-108C and 110A-110C may refer, for example, to a switch.

The sequential bus segments of the first ethernet bus section 162A may comprise a point-to-point ethernet bus segment between a first switch 108A and a second switch 108B and a first multi-drop ethernet bus segment 164A between the first switch 108A and the second switch 108B. Similarly, the sequential bus segments of the second ethernet bus section 162B may comprise a point-to-point ethernet bus segment between a third switch 110A and a fourth switch 110B and a second multi-drop ethernet bus segment 164B between the third switch 110A and the fourth switch 110B. The point-to-point ethernet bus may be, for example, a 100BASE-TX or 10BASET1L point-to-point ethernet bus. The multi-drop ethernet bus segment 164A, 164B may comprise, for example, a 10BASE-T1S multi-drop ethernet bus.

A node 116A may be arranged in the first multi-drop ethernet bus segment 164A and a node 118A may arranged in the second multi-drop ethernet bus segment 164B. The nodes 116A, 118A may refer, for example, to a floor control board configured at each floor. The elevator communication system may further comprise a shared ethernet bus segment 140A configured between nodes 116A and 118A.

One or more nodes 120A, 122A, 120B, 122B may be connected directly to the nodes 116A, 118A, for example, a display, one or more call buttons, one or more key switches, one or more on/off indicators etc. Further, one of more of the illustrated nodes may be configured to interface with at least one of an elevator fixture, an elevator sensor, an elevator safety device, and an elevator control device.

The elements between the nodes 116A and 118A may be arranged similarly between nodes 116B, 118B and nodes 116C, 118C.

Further, one or more nodes illustrated in FIG. 1C may send information from sensors or fixtures to the elevator controller 100, 102 and receive information therefrom to control, for example, actuators configure fixtures etc. One or more nodes illustrated in FIG. 1C may be safety nodes in accordance with IEC61508 SIL level 3, having a safety processing unit and a separate communication controller. The safety nodes may be configured to interface with elevator safety devices, such as safety sensors or safety contacts indicating elevator safety, e.g. landing door contacts, door lock contacts, contact of overspeed governor, buffer contacts etc.

As illustrated in FIG. 1C, the nodes 116A-116C, 118A-118C may comprise or may act as a switch to the multi-drop segments 140A-140C, i.e. landing segments. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

Further, as can be seen from FIG. 1C, each important node in the elevator communication system is reachable via at least two different routes. The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1D:
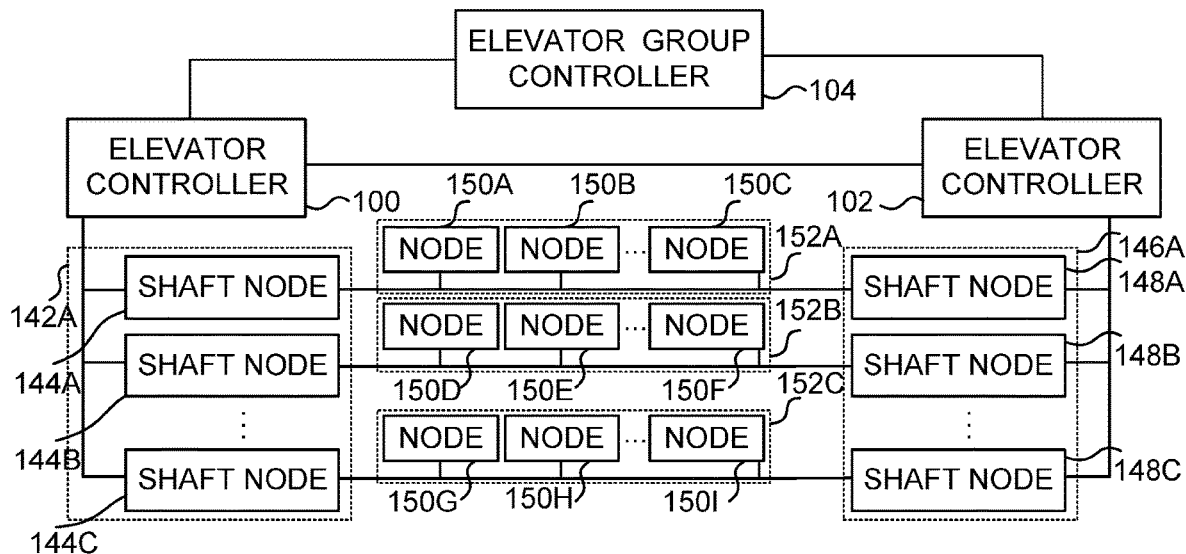
FIG. 1D illustrates an elevator communication system according to another example embodiment.

FIG. 1D illustrates an elevator communication system according to an example embodiment. The elevator communication system comprises a first elevator controller 100 that is communicatively connected to a second elevator controller. The elevator communication system may further comprise an elevator group controller 104 communicatively connected to both elevator controllers 100, 102. In some embodiments, the elevator group controller 104 may be integrated into one of the elevator controllers 100, 102 such that the elevator controller runs also group controller software to implement group controller functions.

The elevator communication system may comprise a first ethernet bus portion 142A connected to the first elevator controller 100 and a second ethernet bus portion 146A connected to the second elevator controller 102. The first ethernet bus portion 142A may comprise a first multi-drop ethernet bus segment connected to the elevator controller 100 and the second ethernet bus portion 146A may comprise a second multi-drop ethernet bus segment connected to the elevator controller 102. The multi-drop ethernet bus segment 142A, 146A may comprise, for example, a 10BASE-T1S multi-drop ethernet bus.

The first ethernet bus portion 106A may comprise one or more nodes, for example, shaft nodes 144A-144C. Similarly, the second ethernet bus portion 146A may comprise one or more nodes, for example, shaft nodes 144A-144C. Similarly, the second ethernet bus portion 146A may comprise one or more nodes, for example, shaft nodes 148A-148C. The first ethernet bus portion 142A may extend in a first elevator shaft and the second ethernet bus portion 146A may extend in a second elevator shaft. In an example embodiment, a single shaft node may be arranged in each floor.

The elevator communication system may further comprise a shared ethernet bus segment 152A-152C communicatively connected to the first ethernet bus portion 142A and to the second ethernet bus portion 146A. One or more elevator system nodes 150A-150L may be connected to the shared ethernet bus segment 150A-150C. The shared ethernet bus segments 150A-150C may be connected to the shaft nodes 144A-144C, 148A-148C as illustrated in FIG. 1D. The shared ethernet bus segment 152A-152C may comprise a multi-drop ethernet bus segment comprising, for example, a 10BASE-T1S multi-drop ethernet bus.

As illustrated in FIG. 1D, the shaft nodes 144A-144C, 148A-148C may comprise or may act as a switch to the shaft multi-drop segments 152A-152C, i.e. landing segments. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

The illustrated solution may enable, for example, a solution with an improved reliability and availability of an all-ethernet elevator communication system. Further, elevator service and data communication in the elevator communication system does not have to be interrupted in case of a single failure in the elevator communication system.

Figure 1E:
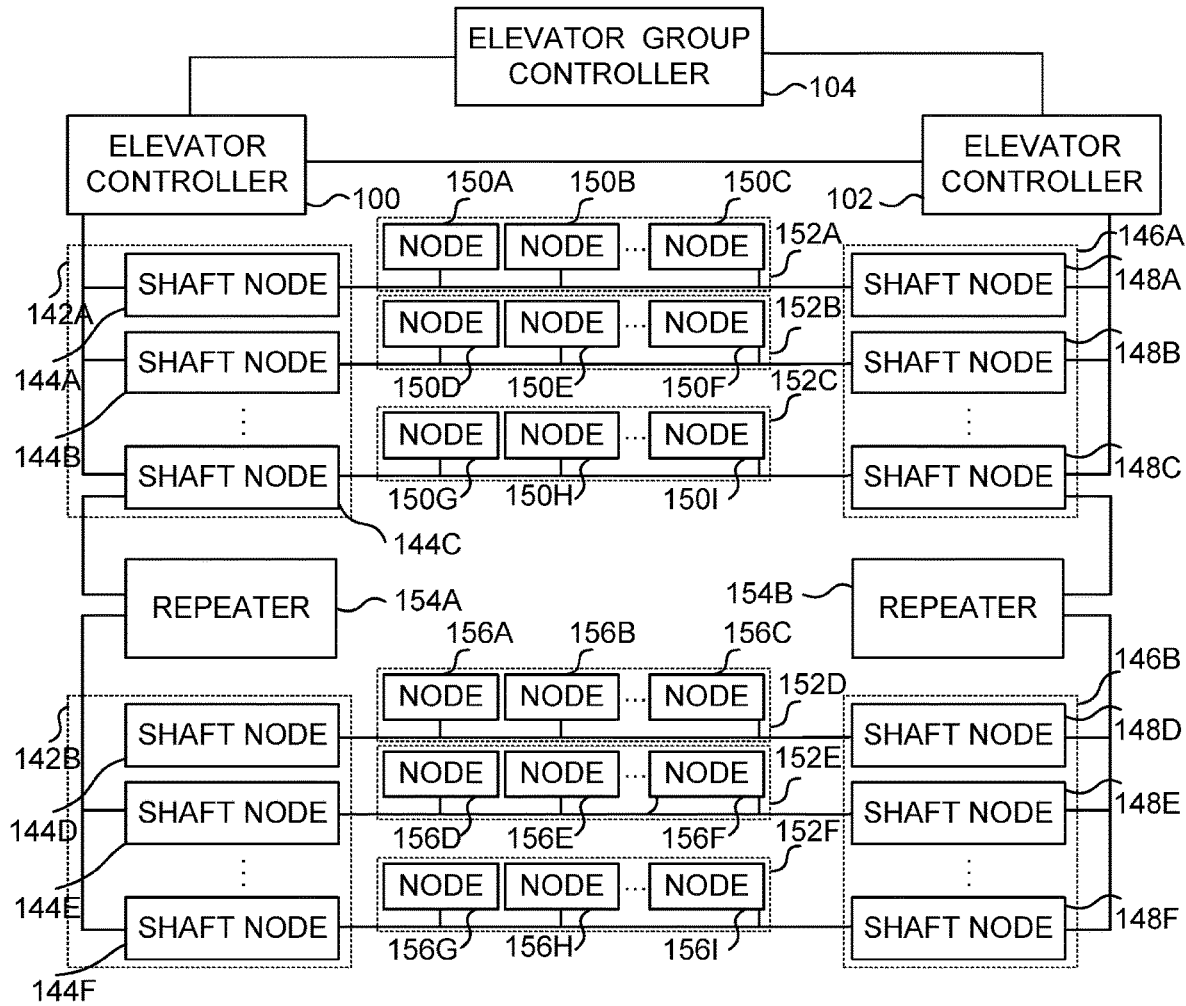
FIG. 1E illustrates an elevator communication system according to another example embodiment.

FIG. 1E illustrates an elevator communication system according to another example embodiment. The embodiment illustrated in FIG. 1E comprises all the elements discussed in relation to FIG. 1D. Additionally, FIG. 1E illustrates a repeater 154A that connects another shaft multi-drop ethernet segment 142B to the multi-drop ethernet segment 142A. As illustrated in FIG. 1E, shared landing segments 152D-152F are connected to the shaft nodes 144D-144F, 148D-148F similarly than was discussed above in relation to FIG. 1D. By using one more repeaters, the physical reach of the multi-drop ethernet bus segments 142A, 146A can be extended.

Although not illustrated in FIGS. 1A-1E, the elevator communication system may further comprise a point-to-point ethernet bus that provides a connection from the elevator controller 100, 102 to an elevator car and to various elements associated with the elevator car. The elevator car may comprise a connecting unit, for example, a switch, to which one or more elevator car nodes may be connected. In an example embodiment, the elevator car nodes can be connected to the connecting unit via a multi-drop ethernet bus segment, thus constituting an elevator car segment. In an example embodiment, the point-to-point-ethernet bus is located in the travelling cable of the elevator car.

In an example embodiment, a node to which a shared ethernet bus segment is connected to, for example, a first node 116A, 116B, 116C, 144A, 144B, 144C, 144D, 144E, 144F, may be configured to act as a coordinator node and a second node 118A, 118B, 118C, 148A, 148B, 148C, 148D, 148E, 148F may be configured to act as a back-up coordinator. A supervision functionality may be arranged so that the first node 116A, 116B, 116C, 144A, 144B, 144C, 144D, 144E, 144F may be configured to periodically supervise the second node 118A, 118B, 118C, 148A, 148B, 148C, 148D, 148E, 148F, to detect loosing of a supervision contact to the second node 118A, 118B, 118C, 148A, 148B, 148C, 148D, 148E, 148F, and to instruct the most distant visible node in the shared ethernet bus segment 140A, 140B, 140C, 152A, 152B, 152C, 152D, 152E, 152F to terminate the shared ethernet bus segment 140A, 140B, 140C, 152A, 152B, 152C, 152D, 152E, 152F. The loosing of the supervision contact may result in, for example, when a node in the shared ethernet bus segment becomes faulty. The second node 118A, 118B, 118C, 148A, 148B, 148C, 148D, 148E, 148F may then be configured to detect loosing of the supervision contact to the first node 116A, 116B, 116C, 144A, 144B, 144C, 144D, 144E, 144F, to set itself as a coordinator, to instruct the most distant visible node in the shared ethernet bus segment 140A, 140B, 140C, 152A, 152B, 152C, 152D, 152E, 152F to terminate the shared ethernet bus segment 140A, 140B, 140C, 152A, 152B, 152C, 152D, 152E, 152F, and to start switching traffic.

When, at some point, the faulty node or another fault in the shared ethernet bus segment 140A, 140B, 140C, 152A, 152B, 152C, 152D, 152E, 152F has been repaired, the first node 116A, 116B, 116C, 144A, 144B, 144C, 144D, 144E, 144F is configured to regain supervision contact to the second node 118A, 118B, 118C, 148A, 148B, 148C, 148D, 148E, 148F and to instruct the most distant visible node in the shared ethernet bus segment 140A, 140B, 140C, 152A, 152B, 152C, 152D, 152E, 152F to remove the termination. Similarly, the second node 118A, 118B, 118C, 148A, 148B, 148C, 148D, 148E, 148F may be configured to regain the supervision contact to the first node 116A, 116B, 116C, 144A, 144B, 144C, 144D, 144E, 144F, to instruct the most distant visible node in the shared ethernet bus segment 140A, 140B, 140C, 152A, 152B, 152C, 152D, 152E, 152F to remove the termination, and to stop switching traffic.

This enables a solution in which the first and second nodes quickly and efficiently notice a fault situation with the shared ethernet bus segment, and the elevator communication system remains functional even in the fault situation as data may be routed using another route.

The elevator communication system discussed above may be implemented in an elevator system comprising one or more elevator shafts. Further, in an example embodiment, the elevator system may comprise a plurality of elevator cars configured to move independently in a same elevator shaft.

Figure 2:
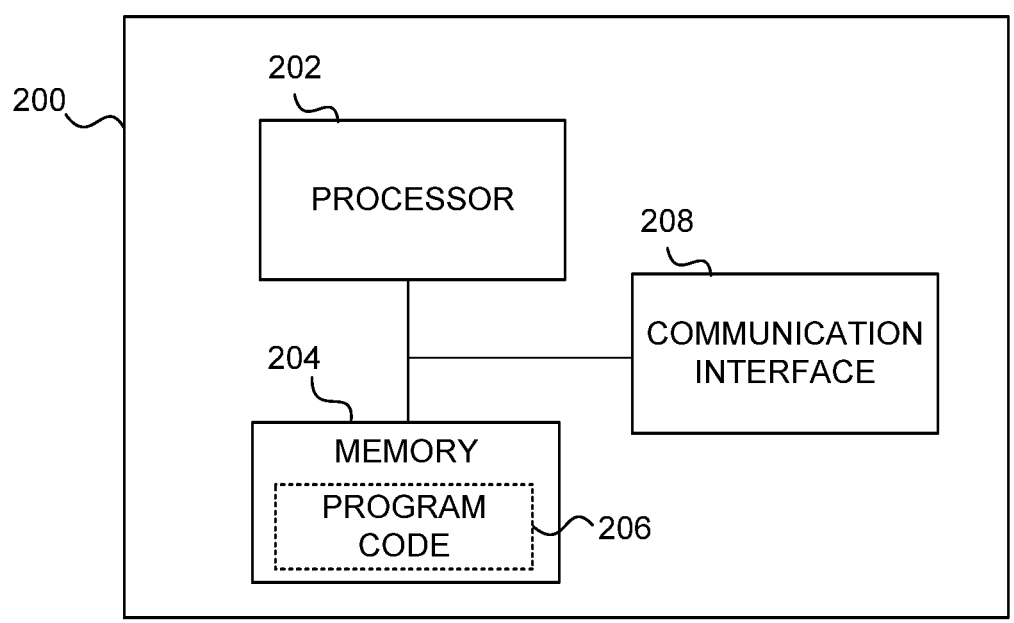
FIG. 2 illustrates an apparatus according to an example embodiment.

FIG. 2 illustrates an apparatus 200 that may operate as a node illustrated in FIGS. 1A-1E according to an example embodiment. The apparatus 200 may comprise at least one processor 202. The apparatus 200 may further comprise at least one memory 204. The memory 204 may comprise program code 206 which, when executed by the processor 202 causes the apparatus 200 to perform at least one example embodiment. The exemplary embodiments and aspects of the subject-matter can be included within any suitable device, for example, including, servers, elevator controllers, workstations, capable of performing the processes of the exemplary embodiments. The exemplary embodiments may also store information relating to various processes described herein. Although the controller 300 is illustrated as a single device it is appreciated that, wherever applicable, functions of the controller 300 may be distributed to a plurality of devices.

Example embodiments may be implemented in software, hardware, application logic or a combination of software, hardware and application logic. The example embodiments can store information relating to various methods described herein. This information can be stored in one or more memories 204, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

The processor 202 may comprise one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments may be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories 204 for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

The apparatus 200 may comprise a communication interface 208 configured to enable the apparatus 200 to transmit and/or receive information, to/from other apparatuses.

The apparatus 200 comprises means for performing at least one method described herein. In one example, the means may comprise the at least one processor 202, the at least one memory 204 including program code 206 configured to, when executed by the at least one processor 202, cause the controller 200 to perform the method.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

One or more of the embodiments discussed above may be implemented in a multicar elevator system. In the multicar elevator system, there are a plurality of elevator cars adapted to move along a common circular path sequentially, in the same direction of circulation. Elevator cars will move upwards along a first shaft and downwards along a second, parallel shaft. Transfer from one shaft to another will take place in a horizontal direction via transfer stations, disposed at least within top and bottom end terminals of the shaft. In some embodiments, propulsion force for the elevator cars may be provided by a linear motor. Each elevator car may have a mover co-acting with a common stator beam which allows the elevator cars to be individually controllable. A first elevator controller may be disposed in the first shaft or associated therewith. A second elevator controller may be disposed in the second shaft or associated therewith. The second elevator controller may be communicatively connected to the first elevator controller. A first ethernet bus portion may be connected to the first elevator controller, and it may extend in the first shaft. A second ethernet bus portion may be connected to the second elevator controller, and it may extend in the second shaft. At least one elevator system node may be communicatively connected to the first elevator controller via the first ethernet bus portion and to the second elevator controller via the second ethernet bus portion. The first elevator controller and the second elevator controller may be configured to control the multicar elevator system. Thus they may comprise altogether, or both separately, the required elevator control functions.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system comprising:
   a first elevator controller;
   a second elevator controller communicatively connected to the first elevator controller;
   a first ethernet bus portion connected to the first elevator controller, the first ethernet bus portion comprising sequential bus segments interconnected by at least one switch, the first ethernet bus portion extending in a first elevator shaft;
   a second ethernet bus portion connected to the second elevator controller, the second ethernet bus portion comprising sequential bus segments interconnected by at least one switch, the second ethernet bus portion extending in a second elevator shaft; and
   at least one elevator system node communicatively connected to the first elevator controller via the first ethernet bus portion and to the second elevator controller via the second ethernet bus portion.

2. The elevator communication system of claim 1,
   wherein the at least one elevator system node comprises a first pit inspection station associated with the first ethernet bus portion and a second pit inspection station associated with the second ethernet bus portion, and
   wherein the first pit inspection station associated with the first ethernet bus portion is communicatively connected to the second pit inspection station associated with the second ethernet bus portion with a multi-drop ethernet bus segment.

3. The elevator communication system of claim 2, wherein the communication system comprises a shared ethernet bus segment communicatively connected to the first ethernet bus portion and to the second ethernet bus portion, and wherein the at least one elevator system node is connected to the shared ethernet bus segment.

4. The elevator communication system of claim 2, wherein the sequential bus segments of the first ethernet bus section comprise a point-to-point ethernet bus segment between a first switch and a second switch and a first multi-drop ethernet bus segment between the first switch and the second switch, and wherein the sequential bus segments of the second ethernet bus section comprise a point-to-point ethernet bus segment between a third switch and a fourth switch and a second multi-drop ethernet bus segment between the third switch and the fourth switch,
   wherein the at least one elevator system node comprises a first node arranged in the first multi-drop ethernet bus segment and a second node arranged in the second multi-drop ethernet bus segment, and
   wherein the elevator communication system further comprises a shared ethernet bus segment configured between the first node and the second node.

5. The elevator communication system of claim 2, further comprising:
   a first multi-drop segment connected to a switch of the first ethernet bus portion, the first multi-drop segment comprising a first node;
   a second multi-drop segment connected to a switch of the second ethernet bus portion, the second multi-drop segment comprising a second node; and
   a shared ethernet bus segment configured between the first node and to the second node.

6. The elevator communication system of claim 1, wherein the communication system comprises a shared ethernet bus segment communicatively connected to the first ethernet bus portion and to the second ethernet bus portion, and wherein the at least one elevator system node is connected to the shared ethernet bus segment.

7. The elevator communication system of claim 6, wherein the shared ethernet bus segment is connected to a switch of the first ethernet bus portion and to a switch of the second ethernet bus portion.

8. The elevator communication system of claim 7, wherein the shared ethernet bus segment comprises a shared multi-drop ethernet bus segment.

9. The elevator communication system of claim 6, wherein the shared ethernet bus segment comprises a shared multi-drop ethernet bus segment.

10. The elevator communication system of claim 1, wherein the sequential bus segments of the first ethernet bus section comprise a point-to-point ethernet bus segment between a first switch and a second switch and a first multi-drop ethernet bus segment between the first switch and the second switch, and wherein the sequential bus segments of the second ethernet bus section comprise a point-to-point ethernet bus segment between a third switch and a fourth switch and a second multi-drop ethernet bus segment between the third switch and the fourth switch,
   wherein the at least one elevator system node comprises a first node arranged in the first multi-drop ethernet bus segment and a second node arranged in the second multi-drop ethernet bus segment, and
   wherein the elevator communication system further comprises a shared ethernet bus segment configured between the first node and the second node.

11. The elevator communication system of claim 10, wherein the first node is configured to act as a coordinator and the second node is configured to act as a back-up coordinator,
   wherein the first node is configured to periodically supervise the second node, to detect loosing of a supervision contact to the second node, and to instruct a most distant visible node in the shared ethernet bus segment to terminate the shared ethernet bus segment, and
   wherein the second node is configured to detect loosing of the supervision contact to the first node, to set itself as a coordinator, to instruct the most distant visible node in the shared ethernet bus segment to terminate the shared ethernet bus segment, and to start switching traffic.

12. The elevator communication system of claim 11, wherein the first node is configured to regain supervision contact to the second node, to instruct the most distant visible node in the shared ethernet bus segment to remove the termination, and
   wherein the second node is configured to regain the supervision contact to the first node, to instruct the most distant visible node in the shared ethernet bus segment to remove the termination, and to stop switching traffic.

13. The elevator communication system of claim 12, wherein the shared ethernet bus segment comprises a shared multi-drop ethernet bus segment.

14. The elevator communication system of claim 11, wherein the shared ethernet bus segment comprises a shared multi-drop ethernet bus segment.

15. The elevator communication system of claim 10, wherein the shared ethernet bus segment comprises a shared multi-drop ethernet bus segment.

16. The elevator communication system of claim 1, further comprising:
 a first multi-drop segment connected to a switch of the first ethernet bus portion, the first multi-drop segment comprising a first node;
 a second multi-drop segment connected to a switch of the second ethernet bus portion, the second multi-drop segment comprising a second node; and
 a shared ethernet bus segment configured between the first node and the second node.

17. The elevator communication system of claim 16, wherein the first node is configured to act as a coordinator and the second node is configured to act as a back-up coordinator,
 wherein the first node is configured to periodically supervise the second node, to detect loosing of a supervision contact to the second node, and to instruct a most distant visible node in the shared ethernet bus segment to terminate the shared ethernet bus segment, and
 wherein the second node is configured to detect loosing of the supervision contact to the first node, to set itself as a coordinator, to instruct the most distant visible node in the shared ethernet bus segment to terminate the shared ethernet bus segment, and to start switching traffic.

18. The elevator communication system of claim 16, wherein the shared ethernet bus segment comprises a shared multi-drop ethernet bus segment.

19. An elevator system comprising the elevator communication system of claim 1.

20. The elevator system of claim 19, comprising a plurality of elevator cars configured to move independently in a same elevator shaft.

* * * * *